US010506075B1

(12) United States Patent
Vaidya (10) Patent No.: US 10,506,075 B1
(45) Date of Patent: Dec. 10, 2019

(54) LINK CORRECTION SYSTEM AND METHODS

(71) Applicant: Amazon Technologies, Inc., Seattle, WA (US)

(72) Inventor: Ashish Vaidya, Karnataka (IN)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 14/225,865

(22) Filed: Mar. 26, 2014

(51) Int. Cl.
*H04L 29/06* (2006.01)

(52) U.S. Cl.
CPC .................... *H04L 67/42* (2013.01)

(58) Field of Classification Search
CPC ....... H04L 67/42; H04L 67/02; H04L 67/327; H04L 43/06; H04L 67/18; H04L 67/2814; H04L 43/08; H04L 63/126; H04L 67/2838; G06Q 30/0277; G06Q 30/0261; G06Q 30/0641; G06Q 30/0643; G06F 16/9566; G06F 16/9558; G06F 17/2235; G01C 21/3415
USPC .......................................................... 709/203
See application file for complete search history.

(56) References Cited

U.S. PATENT DOCUMENTS

| | | | | |
|---|---|---|---|---|
| 5,935,210 A * | 8/1999 | Stark | ................... | G06F 17/3089 707/E17.116 |
| 7,072,651 B2 * | 7/2006 | Jiang | ..................... | H04W 48/18 455/432.1 |
| 7,315,826 B1 * | 1/2008 | Guheen | ............... | G06F 17/3089 705/7.29 |
| 7,386,614 B2 * | 6/2008 | Barritz | ............. | H04L 29/12132 709/226 |
| 7,493,565 B2 * | 2/2009 | Parupudi | ............. | G06F 17/3087 715/738 |
| 7,860,968 B2 * | 12/2010 | Bornhoevd | ........... | G06F 9/5088 709/224 |
| 7,962,363 B2 * | 6/2011 | Patel | ..................... | G06Q 30/02 705/14.4 |
| 7,975,020 B1 * | 7/2011 | Green | ................ | G06Q 30/0241 705/14.4 |
| 8,032,409 B1 * | 10/2011 | Mikurak | ................ | G06Q 10/00 705/14.39 |
| 8,156,180 B2 * | 4/2012 | Adelman | .............. | G06F 16/954 709/203 |
| 8,494,903 B2 * | 7/2013 | Silberstein | ............. | G06Q 30/02 705/14.4 |
| 8,494,958 B2 * | 7/2013 | Schoenberg | ......... | G06Q 20/102 705/35 |
| 8,515,888 B2 * | 8/2013 | Ventilla | .................. | G06Q 10/10 706/45 |

(Continued)

*Primary Examiner* — Sargon N Nano
(74) *Attorney, Agent, or Firm* — Knobbe, Martens, Olson & Bear LLP (57) ABSTRACT

A dynamic link updater may be configured to automatically and autonomously identify an affiliate associated with an affiliate network site. The dynamic link updater may update or correct an affiliate link based on the identified affiliate link. Further, the dynamic link updater can determine additional parameters to correct or update in the affiliate link, such as information relating to a device used to access the affiliate link. For example, the affiliate link may be updated to include an identity of the type of device or the location of the device used to access the affiliate link. This information may be used to facilitate compensating the affiliate for providing a link to another network site from the affiliate network site.

21 Claims, 4 Drawing Sheets

(56) References Cited

U.S. PATENT DOCUMENTS

| | | | | |
|---|---|---|---|---|
| 8,583,501 B2* | 11/2013 | Dierks | G06Q 20/102 | 705/26.1 |
| 8,655,718 B2* | 2/2014 | Athsani | G06Q 30/02 | 705/14.51 |
| 8,838,767 B2* | 9/2014 | Lakes | H04L 67/327 | 370/254 |
| 8,868,448 B2* | 10/2014 | Freishtat | G06Q 30/06 | 379/265.09 |
| 8,874,687 B2* | 10/2014 | Gupta | H04L 67/306 | 709/203 |
| 8,898,297 B1* | 11/2014 | Taylor | G06F 17/30867 | 707/706 |
| 9,110,752 B2 | 8/2015 | Sherman | G06F 8/61 | |
| 9,684,909 B2* | 6/2017 | Baker | G06Q 30/0207 | |
| 2002/0052948 A1* | 5/2002 | Baudu | G06Q 30/02 | 709/224 |
| 2004/0088348 A1* | 5/2004 | Yeager | H04L 67/104 | 709/202 |
| 2005/0097107 A1* | 5/2005 | Burt | G06F 17/30864 | |
| 2005/0234775 A1* | 10/2005 | Pearson | G06Q 30/02 | 705/14.16 |
| 2006/0178918 A1* | 8/2006 | Mikurak | G06Q 10/06 | 705/7.25 |
| 2007/0038567 A1* | 2/2007 | Allaire | G06Q 30/0239 | 705/50 |
| 2007/0061393 A1* | 3/2007 | Moore | G06F 17/3089 | 709/201 |
| 2007/0073723 A1* | 3/2007 | Ramer | G06Q 30/02 | |
| 2007/0192253 A1* | 8/2007 | Gill | G06F 21/10 | 705/51 |
| 2008/0195664 A1* | 8/2008 | Maharajh | G06F 17/30035 | |
| 2008/0215475 A1* | 9/2008 | Ramer | G06F 17/30867 | 705/37 |
| 2008/0306782 A1* | 12/2008 | Ephrati | G06Q 30/02 | 705/14.41 |
| 2009/0254971 A1* | 10/2009 | Herz | G06Q 10/10 | 726/1 |
| 2009/0271412 A1* | 10/2009 | Lacapra | G06F 17/30206 | |
| 2009/0271497 A1* | 10/2009 | Roberts | G06Q 30/02 | 709/218 |
| 2009/0276771 A1* | 11/2009 | Nickolov | G06F 9/4856 | 717/177 |
| 2010/0058160 A1* | 3/2010 | Navarro | G06Q 10/0637 | 715/208 |
| 2010/0070448 A1* | 3/2010 | Omoigui | H01L 27/1463 | 706/47 |
| 2010/0094878 A1* | 4/2010 | Soroca | G06F 17/30035 | 707/748 |
| 2010/0287048 A1* | 11/2010 | Ramer | H04W 4/21 | 705/14.46 |
| 2011/0010732 A1* | 1/2011 | Opdycke | G06Q 30/02 | 725/10 |
| 2011/0022812 A1* | 1/2011 | van der Linden | G06F 9/5077 | 711/163 |
| 2011/0177799 A1* | 7/2011 | Ramer | G06Q 30/02 | 455/414.1 |
| 2011/0202874 A1* | 8/2011 | Ramer | G06F 17/30398 | 715/810 |
| 2011/0214050 A1* | 9/2011 | Stambaugh | G06F 3/04817 | 715/234 |
| 2011/0225417 A1* | 9/2011 | Maharajh | G06F 21/10 | 713/150 |
| 2011/0258049 A1* | 10/2011 | Ramer | G06F 17/30867 | 705/14.66 |
| 2011/0269535 A1* | 11/2011 | Kelly | G07F 17/3239 | 463/25 |
| 2011/0282997 A1* | 11/2011 | Prince | H04L 63/1416 | 709/226 |
| 2011/0302321 A1* | 12/2011 | Vange | G06F 9/5027 | 709/241 |
| 2012/0054095 A1* | 3/2012 | Lesandro | G06Q 20/10 | 705/39 |
| 2012/0072283 A1* | 3/2012 | DeVore | G06Q 30/0251 | 705/14.49 |
| 2012/0089996 A1* | 4/2012 | Ramer | H04H 60/46 | 725/14 |
| 2012/0165046 A1* | 6/2012 | Rhoads | G01C 21/20 | 455/456.3 |
| 2012/0173692 A1* | 7/2012 | Lakes | H04L 67/327 | 709/223 |
| 2012/0190386 A1* | 7/2012 | Anderson | G01C 15/04 | 455/456.3 |
| 2012/0289147 A1* | 11/2012 | Raleigh | H04L 67/2847 | 455/3.06 |
| 2012/0323674 A1* | 12/2012 | Simmons | G06Q 30/02 | 705/14.41 |
| 2013/0029745 A1* | 1/2013 | Kelly | G07F 17/32 | 463/19 |
| 2013/0046582 A1* | 2/2013 | Ramer | G06Q 10/101 | 705/7.32 |
| 2013/0053005 A1* | 2/2013 | Ramer | H04W 4/025 | 455/414.1 |
| 2013/0055097 A1* | 2/2013 | Soroca | G06Q 30/0247 | 715/738 |
| 2013/0073387 A1* | 3/2013 | Heath | G06Q 50/01 | 705/14.53 |
| 2013/0073388 A1* | 3/2013 | Heath | G06Q 50/01 | 705/14.53 |
| 2013/0073473 A1* | 3/2013 | Heath | G06Q 30/02 | 705/319 |
| 2013/0080447 A1* | 3/2013 | Ramer | G06F 17/30867 | 707/748 |
| 2013/0104251 A1* | 4/2013 | Moore | G06F 21/602 | 726/30 |
| 2013/0132854 A1* | 5/2013 | Raleigh | G06F 3/0482 | 715/738 |
| 2013/0166332 A1* | 6/2013 | Hammad | G06Q 40/10 | 705/5 |
| 2013/0166580 A1* | 6/2013 | Maharajh | H04L 65/605 | 707/758 |
| 2013/0268357 A1* | 10/2013 | Heath | H04L 63/00 | 705/14.53 |
| 2013/0290234 A1* | 10/2013 | Harris | G06N 5/022 | 706/46 |
| 2013/0291060 A1* | 10/2013 | Moore | G06F 21/6245 | 726/1 |
| 2014/0006129 A1* | 1/2014 | Heath | G06Q 30/0222 | 705/14.23 |
| 2014/0007222 A1* | 1/2014 | Qureshi | G06F 21/10 | 726/16 |
| 2014/0019248 A1* | 1/2014 | Stoliartchouk | G06Q 30/0261 | 705/14.58 |
| 2014/0019266 A1* | 1/2014 | Stoliartchouk | G06Q 30/0277 | 705/14.73 |
| 2014/0019958 A1* | 1/2014 | Sherman | G06F 8/61 | 717/178 |
| 2014/0046777 A1* | 2/2014 | Markey | G06Q 30/0269 | 705/14.66 |
| 2014/0129457 A1* | 5/2014 | Peeler | G06Q 10/067 | 705/317 |
| 2014/0179390 A1* | 6/2014 | Kelly | G07F 17/3237 | 463/13 |
| 2014/0180825 A1* | 6/2014 | Ramer | G06Q 30/0267 | 705/14.64 |
| 2014/0201350 A1* | 7/2014 | Lakes | H04L 67/02 | 709/223 |
| 2014/0325328 A1* | 10/2014 | Beadles | G06F 17/2235 | 715/208 |
| 2015/0088693 A1* | 3/2015 | Moore | G06Q 30/0627 | 705/26.61 |
| 2017/0178228 A1* | 6/2017 | Galiano | G06Q 30/02 | |

* cited by examiner

402 — Affiliate Link – https://www.example1.com

404 — Updated Affiliate Link – https://www.example1.com?aid=entity5&linktype=Type2
                                                          ⎵406        ⎵408

FIG. 4A

410 —
Affiliate Link – https://www.example2.com/mp3/store/startSignIn?aid=wrongID&linktype=wrongtype&return=https%3A%2F%2F
                                                                  ⎵414        ⎵416
www.example2.com%2Fmp3%2Fstore%2F%3Fie%3DUTF8%26device%3Dandroid_browser%23restore%2Fpurchase%257Ctrack%257CB0
086JYZ76

412 —
Updated Affiliate Link – https://www.example2.com/mp3/store/startSignIn?aid=entity5&linktype=Type2&return=https%3A%2F%2F
                                                                         ⎵418        ⎵420
www.example2.com%2Fmp3%2Fstore%2F%3Fie%3DUTF8%26device%3Dandroid_browser%23restore%2Fpurchase%257Ctrack%257CB0
086JYZ76

FIG. 4B

430 —
                ⎵434
Affiliate Link – http://www.example3.com/gp/aw/d/B000O1QM8E/ref=sr_1_1?m=ATVPDKIKX0DER&s=jewelry&ie=UTF8&
qid=1392098224&sr=1-1#restore&aid=wrongID
                                ⎵436
                            ⎵438

432 —
Updated Affiliate Link – https://www.example3.com/gp/aw/d/B000O1QM8E/ref=sr_1_1?aid=entity30&linktype=Type3&
                            ⎵440                                                     ⎵442
m=ATVPDKIKX0DER&s=jewelry&ie=UTF8&qid=1392098224&sr=1-1#restore&aid=wrongID
                                                                 ⎵444

FIG. 4C

LINK CORRECTION SYSTEM AND METHODS

BACKGROUND

Retailers attempt to sell as many products as possible to increase profits. Network-based retailers, or retailers that also maintain network-based sites (such as web sites) for selling items, are no different from brick-and-mortar retailers in their desire to sell as many items as possible. In an attempt to increase sales, some network-based retailers will partner with other network sites to generate traffic to the network site of the network-based retailer. These other network sites are sometimes called associate sites or affiliate network sites. In some cases, the owner or manager of the network-based retailer will share a portion of a sale with the affiliate network site or the owner manager of the affiliate network site.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

In order for sales to be shared among the various network-based sites, it is beneficial to discover or keep track of the affiliate network site that provided the traffic to the network-based retailer that resulted in a sale. In some cases, a user accesses the network-based retailer through a link placed on the affiliate network site. This link may often include attribution information that identifies the affiliate network site to the network-based retailer.

The percentage of users accessing online or network content via mobile computing systems is greatly increasing. Further, an ever-increasing percentage of this access to network content is occurring through mobile applications. For example, a number of mobile applications exist for social networking, banking, gaming, accessing news, etc. For many users, these mobile applications serve as replacements for network sites typically accessed through a desktop or laptop computer.

Many network sites may include links to external or independent network sites that sell items or provide services. The network sites providing the links may be affiliate or associate network sites and the links may be affiliate or associate links. In some cases, when a user accesses the external or independent network site via an affiliate link, the affiliate network site, or a related entity, may be credited or receive compensation.

To continue generating revenue from affiliate links, it is often desirable to include versions of the affiliate links in the mobile applications that are serving as replacements for network sites for many users. Thus, often when a mobile application is created to provide access to content of the affiliate network site, the creator or developer will include affiliate links to the external network site in the mobile application. Sometimes, the mobile application is created by a developer, and the developer includes the affiliate links. In other cases, a mobile application may be generated by an automated system capable of generating the mobile application from the network pages of a network site, as an automated replacement for the network site.

Whether a developer creates the mobile application or an application generator creates the mobile application, mistakes may be introduced into the affiliate links or omissions made. For example, information used to identify an entity associated with the affiliate network site may be omitted or incorrect. In some cases, modifications may be desirable because, for example, an entity may offer greater compensation for traffic received from a mobile application or items purchased via the mobile application instead of via a network site. Thus, if the affiliate link included in the mobile application does not correctly identify that the affiliate link was accessed via the mobile application instead of the affiliate network site, the entity associated with the affiliate network site may receive reduced compensation.

Certain embodiments disclosed herein include a dynamic link updater that automatically and autonomously identifies an affiliate associated with an affiliate network site. The dynamic link updater may update the affiliate link based on the identified affiliate. Further, the dynamic link updater can determine additional parameters to correct or update in the affiliate link, such as information relating to a device used to access the affiliate link. For example, the affiliate link may be updated to include an identity of the type of device or the location of the device used to access the affiliate link. This information may be used to facilitate compensating the affiliate for providing a link to another network site, the target network site, from the affiliate network site.

Example Network Computing Environment

Figure 1:
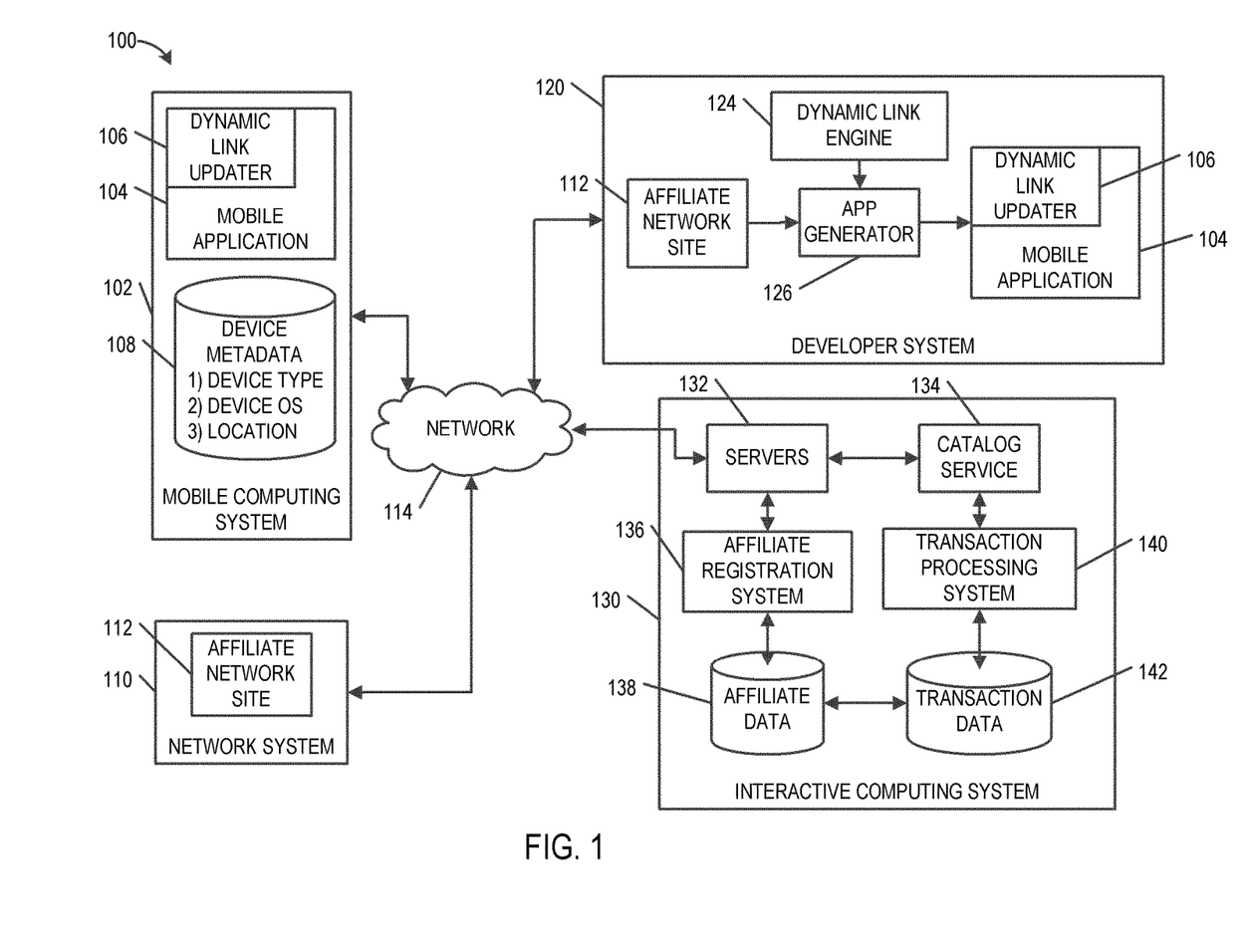
FIG. 1 is a block diagram of an embodiment of a network computing environment.

FIG. 1 is a block diagram of an embodiment of a network computing environment 100. The network computing environment 100 includes a mobile computing system 102 that may be used by one or more users to access a network system 110 and an interactive computing system 130. The mobile computing system 102 may include a number of applications (not shown) including applications that facilitate accessing one or more network sites (e.g., a browser). Although in some cases the mobile computing system 102 may interact or communicate directly with additional computing systems, such as the network system 110, generally the mobile computing system 102 will interact or communicate with the additional computing systems via the network 114.

The network system 110 may include an affiliate network site 112. This affiliate network site 112 can include a number of different types of network sites and is generally not limited in type. For example, the affiliate network site 112 may be a social networking site, a news site, a weblog or blogging site, a financial services site (e.g., a banking site, an investing site, a financial information aggregation site, etc.), a special interests site (e.g., a gaming news site, a recipe site, a site for collecting and displaying animal pictures, etc.), or a metasearch or metalisting site for collecting links to other resource or shopping sites, to name a few. Further, the affiliate network site 112 may include one or more links to a network site (not shown) hosted by the interactive computing system 130. These links may sometimes be referred to as affiliate links or associate links. Further, to simplify discussion and not to limit this disclosure, the network site hosted by the interactive computing system 130 may be referred to herein as a target network site.

Figure 4A:
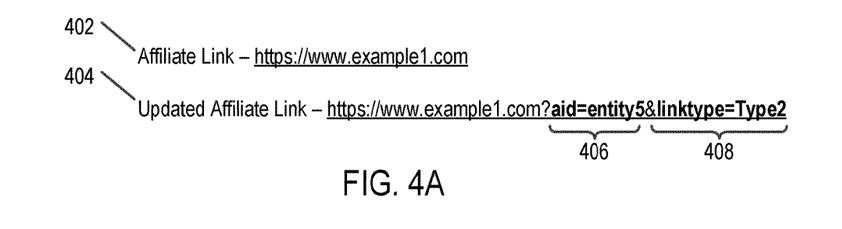
FIGS. 4A-4C illustrate examples of affiliate links and corresponding updated affiliate links generated using embodiments described herein.
Figure 4B:
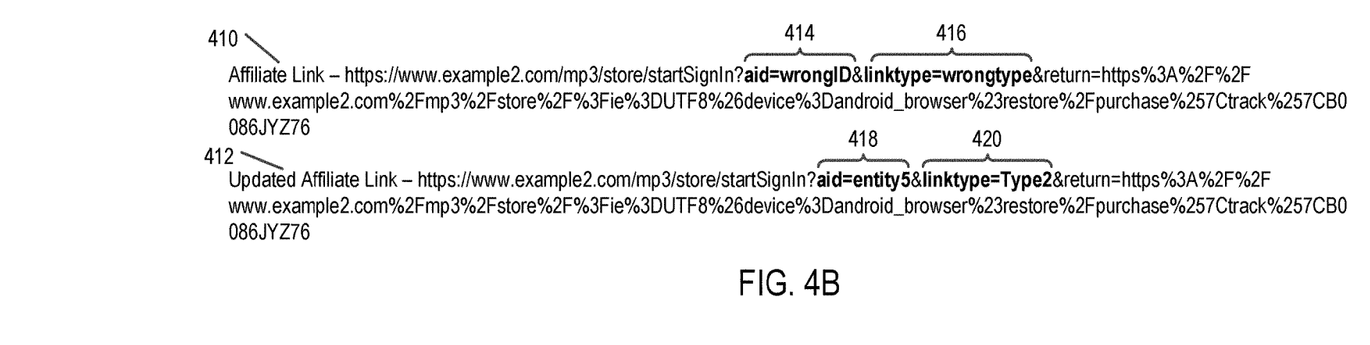
Figure 4C:
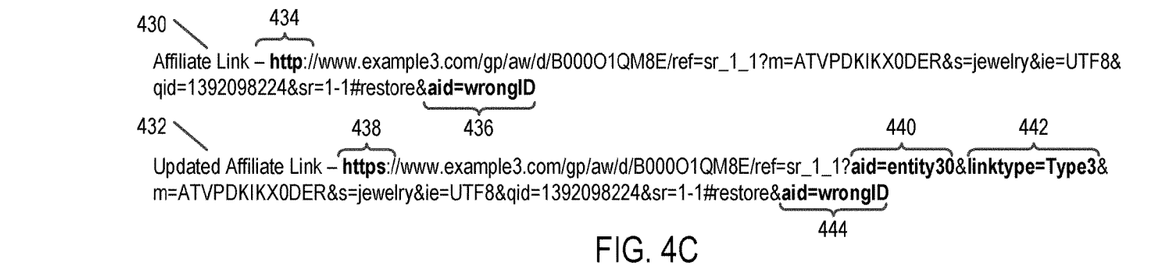

Often, the affiliate links may be configured with a particular format or may include a number of particular parameters. For example, the affiliate link may be formatted to include the name or address of the target network site. Subsequent to the address may be a delimiter which separated the address from a number of parameters that follow the name or address of the network site. These parameters may identify the affiliate to be compensated when a user accesses the network site via the affiliate link and/or purchases an item on the target network site after accessing the affiliate link. Some non-limiting examples of the affiliate links are depicted in FIGS. 4A-4C, which are discussed in more detail below.

Affiliate links may include any type of link to a network page. For example, the affiliate links may be Uniform Resource Locator (URL) links or Uniform Resource Identifiers (URIs). Further, the affiliate links may be text links or may be links included in banners or widgets of a network page. In some cases, the affiliate links may be to a front page of a network site. In other cases, the affiliate links may be to particular pages of the network site, such as to an item-detail page of a specific item. Further, in some cases, accessing the affiliate link may cause a page to be generated by target network site to which the affiliate link points. For example, accessing the affiliate link may cause a search to be generated at the target network site, which may then result in a corresponding search results page being generated and presented to a user.

In addition to the applications mentioned above, the mobile computing system 102 also includes a mobile application 104. The mobile application 104 may be an application version of a particular network site (e.g., the affiliate network site 112). In other words, the mobile application 104 may be an application developed to provide access to the affiliate network site 112 and/or a version of the affiliate network site 112, which may or may not be identical to the affiliate network site 112. For example, in cases where the affiliate network site 112 is a social networking site, the mobile application 104 may be an application configured to provide access to features of the social networking site via the mobile application 104 instead of, for example, a browser. As a second example, in cases where the affiliate network site 112 hosts a video game playable via the affiliate network site 112, the mobile application 104 may be a version of the videogame. As a third example, in cases where the affiliate network site 112 is a financial services site (e.g., a network page for a bank, a network page for a brokerage or other investment site, etc.), the mobile application 104 may be an application configured to provide access to features of the financial services site. As a fourth example, the affiliate network site 112 may be a content-delivery or content-aggregation site. For instance, the affiliate network site 112 may be a hosting site for weblogs or blogs, a news site, or a topic-specific site (e.g., for video games, television shows, cooking, child rearing, etc.). In such cases, the mobile application 104 may be an application configured to provide access to the content of the affiliate network site 112. Although mobile applications typically correspond to a particular network site, in some cases, the mobile application 104 may be generated or developed based on multiple network sites. In addition, although termed a mobile application, in some cases, the mobile application 104 may include any type of application that may be accessed by a computing system, including a traditional or non-mobile computing system. In other words, the mobile application 104 is not limited to applications designed for mobile devices.

When the mobile application 104 is generated from the affiliate network site 112, the affiliate links included in the affiliate network site 112 may be included or may be updated for inclusion in the mobile application 104. However, as previously discussed, in some cases the affiliate links included in the mobile application 104 may not be formatted correctly and/or may not include desired parameters, such as an identity of the affiliate or associate corresponding to the affiliate link.

As illustrated in FIG. 1, the mobile application 104 may include a dynamic link updater 106. This dynamic link updater 106 may be configured to update or correct an affiliate link included in the mobile application 104. Updating or correcting the affiliate link may include reformatting the affiliate link and/or including parameters that may be missing from the affiliate link, such as an identity of the type of the affiliate link (e.g., a text link, a banner link, etc.). The dynamic link updater 106 may include a library or software module included with the mobile application 104 for detecting access by a user of an affiliate link and for updating or correcting the affiliate link.

Alternatively, the dynamic link updater 106 may be a separate system included on the mobile computing system 102. Advantageously, in certain embodiments, when the dynamic link updater 106 is a separate system, the dynamic link updater 106 may be used with multiple mobile applications. Generally, the dynamic link updater 106 is a software module. However, in some embodiments, the dynamic link updater 106 may be a hardware system. For example, the dynamic link updater 106 may be a dongle configured to be attached to a USB port of the mobile computing system 102.

The mobile computing system 102 may include a variety of different types of computing devices including any type of computing device that can communicate with the interactive computing system 130 and/or the network system 110. Further, although identified as a mobile computing system, the mobile computing system 102 may also include computing systems not normally identified as mobile computing systems, such as desktop computer systems. Examples of the mobile computing system 102 may include desktops, laptops, video game platforms, television set-top boxes, televisions (e.g., Internet TVs), computerized appliances, kiosks, and wireless mobile devices (e.g., smart phones, PDAs, tablets, electronic book readers, or the like), to name a few.

Further, the mobile computing system 102 may include any type of software that can facilitate communication with the interactive computing system 130 and/or the network system 110. For example, the mobile computing system 102 may include a browser or an application (e.g., the mobile application 104) configured to provide access to the interactive computing system 130 and/or the network system 110. The network 114 can include any type of communications network. For example the network 114 may include one or more of a wide area network (WAN), a local area network (LAN), a cellular network, an ad hoc network, a satellite network, a wired network, a wireless network, etc., or any combination thereof. Further, in some cases, the network 104 may include the Internet.

The mobile computing system 102 may also include a device metadata repository 108. This device metadata repository 108 may store any type of information related to the configuration and/or the usage of the mobile computing system 102. For example, the device metadata repository 108 may include information relating to the device type mobile computing system 102, the operating system of the mobile computing system 102, and/or the location of the mobile computing system 102, including a network location and/or geographic location. In some embodiments, at least some of the device metadata may be stored in other locations of the mobile computing system 102, such as in a memory reserved for a Basic Input/Output System (BIOS) of the mobile computing system 102.

As with the mobile computing system 102, the network system 110 may include a variety of different types of computing devices. Generally, the network system 110 may include one or more computing devices capable of hosting a network site, such as the affiliate network site 112. In some cases, the network system 110 may represent a distributed set of computing devices. For example, the network system 110 may include one or more desktops or servers.

Interactive computing system 130, as with the network system 110, may include any type of computing system capable of hosting a network site (e.g., the target network site). The interactive computing system 130 can be implemented with one or more physical servers or computing machines, which may include one or more processors. Thus, each of the components depicted in the interactive computing system 130 can include hardware and/or software for performing various features. Further, the interactive computing system 130 may be associated with an entity that compensates another entity that is associated with the affiliate network site 112 based on users accessing the target network site via the affiliate links included in the affiliate network site 112 and/or the mobile application 104. Although the type of network site hosted by the interactive computing system 130 is not limited, often the network site will be at least partially dedicated to selling items, products, or services to a user. For example, the network site hosted by the interactive computing system 130 may be an electronic commerce or ecommerce network site, or website.

The interactive computing system 130 may include a number of components that can be implemented in hardware and/or software and may be configured to facilitate hosting a network site. Further, the interactive computing system 130 may include a number of components configured to facilitate tracking access to the target network site via the affiliate links and compensating entities associated with the affiliate links. For instance, the interactive computing system 130 includes one or more servers 132 for receiving and responding to network requests from user computing systems, such as the mobile computing system 102. The one or more servers 132 can include web servers, application servers, or other types of servers. The interactive computing system 130 may also include a catalog service 134. The catalog service 134 can generate an electronic catalog of items based on the item data stored in an item data repository (not shown) of the interactive computing system 130. The items included in the electronic catalog may be available for purchase and may be presented to users of user computing systems via, for example, the servers 132. Although not illustrated, the interactive computing system 130 may include one or more additional systems to facilitate operation of a commerce site or network site, such as a search engine for searching a catalog provided by the catalog service 134, a user account repository for storing user account information, a recommendation system for recommending items to a user, a data mining system to facilitate generating recommendations, etc.

Interactive computing system 130 further includes an affiliate registration system 136 and a transaction processing system 140. In addition, the interactive computing system 130 includes a number of repositories including the affiliate data repository 138 and the transaction data repository 142. The affiliate registration system 136 may include any system configured to register a network site as an affiliate network site of the target network site.

In some cases, any entity and/or network site may register with the interactive computing system 130. Further, in some cases, the affiliate registration system 136 may register an entity instead of or in addition to the affiliate network site. In cases where the entity is registered, any network site may serve as an affiliate network site if it includes a link to the target network site and the entity may be compensated if the link includes an identifier (e.g., an affiliate or associate identifier) for the entity. In some implementations, the affiliate registration system 136 may filter and/or vet particular network sites and/or entities before including the network site and/or entity as an affiliate. Further, the affiliate registration system 136 may be configured to assign an identifier to and/or to create an account for the registering entity and/or network site (e.g., the affiliate network site 112). Information associated with the registration of the affiliate network site 112 and/or an affiliate may be stored at the affiliate data repository 138. This information may include identity information, rate or payment terms, account information, tax information, and any other information that may be included in an affiliate agreement between the affiliate entity and an entity associated with the target network site.

The transaction processing system 140 may include any system for processing transactions associated with the network site hosted by the interactive computing system 130. These transactions may include, for example, purchases of items made available through the catalog service 134. Transaction data associated with the transactions may be stored at the transaction data repository 142. Further, the transaction data may include information associated with the method with which the user accessed the network site associated with the interactive computing system 130. For example the transaction data may identify whether the user accessed an affiliate link to reach the target network site or directly entered the Uniform Resource Locator (URL) of the target network site into a browser. In addition, the transaction data may identify the type of device (e.g., the mobile computing system 102) used to access the target network site. In some embodiments, information relating to accessing the target network site may be stored at the affiliate data repository 138. In certain embodiments, by storing information relating to accessing the target network site, compensation for the entity associated with the affiliate network site 112 or affiliate link may be determined. For example, the entity associated with the affiliate network site 112, and the mobile application 104, may receive compensation each time a user accesses the target network site via an affiliate link from the affiliate network site 112 and/or the mobile application 104. In some cases, affiliate links may be inserted into network sites that are not affiliate network sites. For example, an entity may accept the inclusion of affiliate links into its network site that compensate a third-party entity in exchange for free or discounted network site hosting, or other benefits.

In certain embodiments, the mobile application 104 may be developed by an entity associated with the affiliate network site 112 (e.g., the owner of the affiliate network site 112). In other embodiments, a mobile application 104 may be developed by a third-party developer. In some cases the mobile application 104 may be developed manually and in other cases a mobile application 104 may be generated using an app generator 126. The app generator 126 may include any system capable of generating an application based on a network site provided to the app generator 126. The app generator 126 may be hosted by a developer system 120. Alternatively, the app generator 126 may be included as part of the network system 110.

As illustrated in FIG. 1, the app generator 126 may receive a copy of the affiliate network site 112 and/or may access the affiliate network site 112 to generate or create the mobile application 104. In some cases, the app generator 126 may also receive or access a dynamic link engine 124. This dynamic link engine 124 may facilitate creation of the mobile application 104. The dynamic link engine 124 may include a library, Application Programming Interface (API), Software Development Kit (SDK), or other software system that can be used by the app generator 126 to facilitate creation of a mobile application 104. In certain embodiments, the dynamic link engine 124 is used to create or insert a dynamic link updater 106 into the mobile application 104. The dynamic link updater 106 may be inserted into the mobile application 104 via software components of the dynamic link engine 124 that override or replace software components generated by instances of the app generator 126 that does not include the dynamic link engine 124. In other words, in some cases the dynamic link updater 106 may override functions or methods created by an app generator 126 in creating an application based on the affiliate network site 112. These overridden functions may include code for updating or correcting an affiliate link upon installation of the mobile application 104 and/or upon access of the affiliate link.

In certain embodiments, the dynamic link engine 124 may at least partially correct or update an affiliate link. For example, the dynamic link engine 124 may determine an affiliate identifier for an entity creating or requesting creation of the mobile application 104. During generation of the mobile application 104, the dynamic link engine can update all the affiliate links to include the affiliate identifier.

Example Application Generation Process

Figure 2:
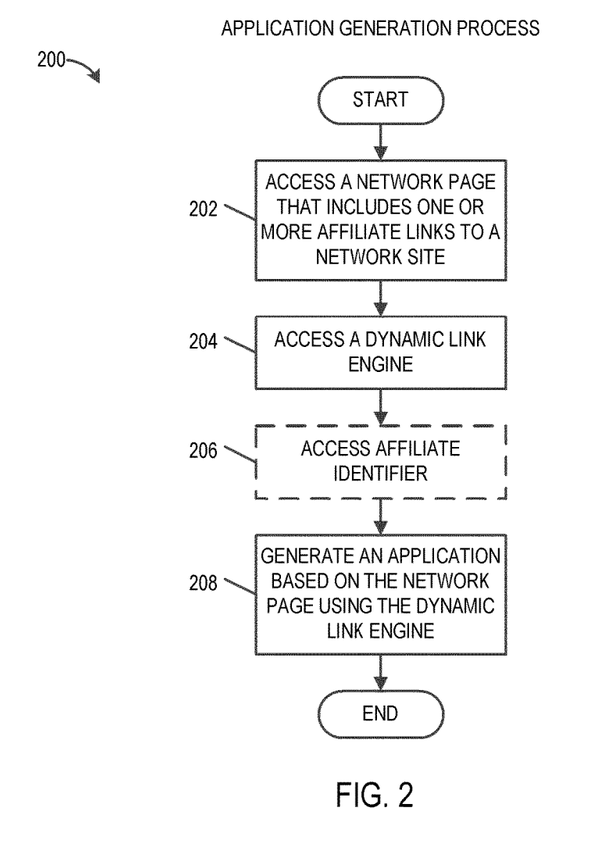
FIG. 2 is a flowchart of an embodiment of an application generation process.

FIG. 2 is a flowchart of an embodiment of an application generation process 200. The process 200 can be implemented by any system that can generate an application from a network site or a number network pages. For example, the process 200, in whole or in part, can be implemented by the developer system 120, the apt generator 126, or the dynamic link engine 124, to name a few. Although any number of systems, in whole or in part, can implement the process 200, to simplify discussion, portions of the process 200 will be described with reference to particular systems. Further, although primarily described with respect to a mobile application on a mobile computing system, the process 200 is not limited as such. In some cases, the process 200 can be performed with respect to any type of application and not just applications designed for execution on mobile computing systems. Further, the process 200, in some cases, may be performed with respect to any type of computing system and not just mobile computing systems.

The process 200 begins at block 202 where, for example, the app generator 126 accesses a network page that includes one or more affiliate links to another network site, or a target network site. The target network site may include a network site hosted by the interactive computing system 130. Further, this network site may be a network-based retailer, or an electronic commerce site. Further, the network page accessed by the app generator 126 may be included as part of an affiliate network site, such as the affiliate network site 112 hosted by the network system 110.

Typically, the affiliate network site 112 is an affiliate site of the target network site. However, in some cases, the affiliate network site 112 may not itself be an affiliate site of the target network site, but may include affiliate links to the target network site. For example, an entity who owns or manages the affiliate network site 112 may receive free hosting from a second entity in exchange for including affiliate links to the target network site. In other words, in this example, the entity who owns or manages the affiliate network site 112 may not be an affiliate of the target network site, but may include affiliate links on behalf of the second entity, which may be an affiliate of the target network site. Thus, in this example, the affiliate identifier associated with the affiliate links of the affiliate network site 112 may identify the hosting entity of the affiliate network site 112 rather than the owner of the affiliate network site 112.

In some cases, the app generator 126 may access the affiliate network site 112 on the network system 110 via the network 114. In other cases, the app generator 126 may access a copy of the affiliate network site 112 that is located on the developer system 120, which in some cases may also act as a host system for the affiliate network site 112, or a version of the affiliate network site 112 optimized for access via the mobile application 104. This optimized version of the affiliate network site 112 may be optimized for access via the mobile application 104 compared to the version of the affiliate network site designed for access via a mobile browser, or a browser for a non-mobile computing system.

At the block 204, the app generator 126 accesses a dynamic link engine 124. As previously described, in some cases the dynamic link engine 124 may be a system capable of updating or correcting links, such as affiliate links. In other cases, the dynamic link engine 124 may insert code capable of updating or correcting links at a determined time, such as upon access of the link by a user. In yet other cases, the dynamic link engine 124 may comprise a SDK, API, or library that includes code for correcting or updating links. In some embodiments, the dynamic link engine 124 may replace or update a SDK, API, or library natively included with the app generator 126.

At block 206, the app generator 126 accesses an affiliate identifier. This affiliate identifier may be associated with the affiliate network site 112, one or more of the affiliate links included in the network page accessed at the block 202, or an entity associated with the affiliate network site 112 and/or an affiliate link. The affiliate identifier may be accessed from an affiliate link included in the affiliate network site 112. This affiliate link may be one of the affiliate links included in the network page accessed at the block 202, or may be another affiliate link. Alternatively, or in addition, the affiliate identifier may be accessed or determined from a network page header associated with the network page accessed at the block 202 or another network page of the affiliate network site 112. In some cases, the affiliate identifier may be presented to a user, such as a developer, for confirmation of its accuracy.

Alternatively, or in addition, the affiliate identifier may be determined by querying a user, such as a developer and/or owner of the affiliate network site 112. In some such cases, the developer may obtain the affiliate identifier by registering with the affiliate registration system 136. Registering with the affiliate registration system 136 may include registering the entity (e.g., the owner or operator of the affiliate network site 112) associated with the affiliate network site 112. Alternatively, or in addition, registering with the affiliate registration system 136 may include registering the entity (e.g., the owner or operator of the affiliate network site 112) associated with the application generated based on the affiliate network site 112. This entity associated with the application may or may not be the same entity as the entity associated with the affiliate network site 112. In certain embodiments, registering with the affiliate registration system 136 may include registering the application created based on the affiliate network site 112.

In some cases, the affiliate network site 112 and one or more applications associated with e affiliate network site 112 may be assigned the same affiliate identifier. In other cases, the affiliate network site 112 and some or all of the applications created based on the affiliate network site 112 may be assigned separate affiliate identifiers. Advantageously, in certain embodiments, even when controlled by the same entity, by providing separate affiliate identifiers for the affiliate network site 112 and the one or more corresponding applications, different compensation may be awarded based on whether the user accessed the network site hosted by the interactive computing system 130 via the affiliate network site 112 or a mobile application 104. Further, tracking and report generation may be simplified by using different affiliate identifiers for the affiliate network site 112 and the mobile application 104. In some embodiments, as illustrated by the dashed lines surrounding the block 206, the block 206 may be omitted and/or optional.

At block 208, the app generator 126 generates an application (e.g., the mobile application 104) based on the network page, or the affiliate network system 112, using the dynamic link engine 124. The application, or app, may include a dynamic link updater 106. In some cases, the dynamic link updater 106 may be a separate system included in the mobile application 104. In other cases, the dynamic link updater 106 may be distributed throughout the code of a mobile application 104, for example, as part of methods or functions that may have been overridden by the dynamic link engine 124.

In some cases, as part of the process of the block 208, at least some of the affiliate links of the network page accessed at the block 202 may be updated. Alternatively, or in addition, the mobile application 104 generated at the block 208 may include code for updating one or more affiliate links when accessed by a user train execution of the mobile application 104.

In some cases, affiliate links may be dynamically inserted upon access of a network page or an application. For example, an affiliate link may be inserted into the network page upon access of the network page or into the application upon execution of the application. In some such cases, the mobile application 104 may include the same affiliate link placeholders as the network page accessed at the block 202, but the dynamic link updater 106 of the mobile application 104 may dynamically correct or update the affiliate links inserted in place of the placeholders. This dynamic correction or update of the inserted affiliate links may occur at the time that the affiliate links are inserted and/or may occur at the time that a user accesses the inserted affiliate link.

In some embodiments, the block 206 may be performed subsequent to the block 208. For example, the application may be generated at the block 208 and then the application may be registered with the interactive computing system 130. In some cases, registering the application may include providing a copy of the application to the interactive computing system 130. By providing the copy of the application to the interactive computing system 130, it is possible to make a determination of whether to grant the application an affiliate status based on the content of the application or its functionality. Thus, in some cases, an application that does not meet standards established by an entity associated with the interactive computing system 130 may be denied an affiliate identifier. In cases where an affiliate identifier is provided for the application, the application can be updated to include the affiliate identifier.

Example Dynamic Link Correction Process

Figure 3:
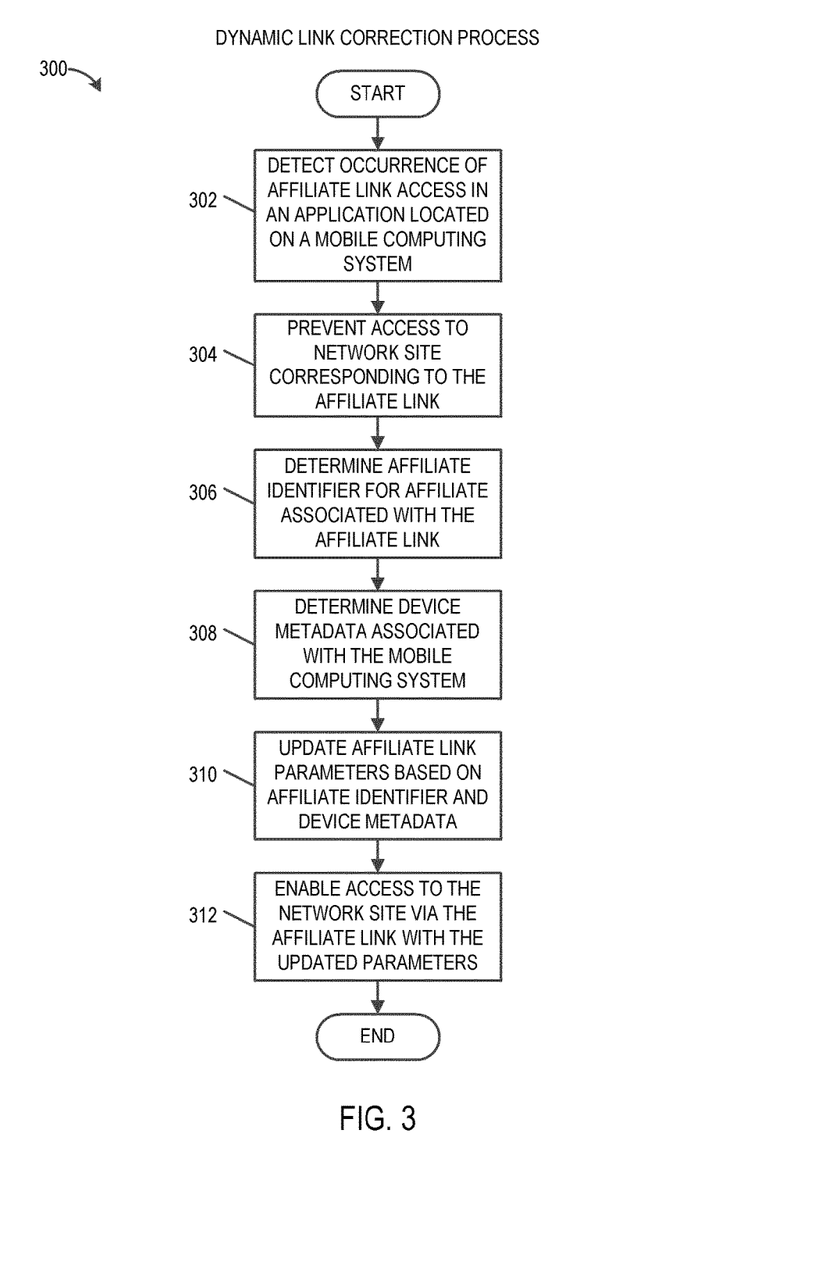
FIG. 3 is a flowchart of an embodiment of a dynamic link correction process.

FIG. 3 is a flowchart of an embodiment of a dynamic link correction process 300. The process 300 can be implemented by any system that can update or correct a link, such as an affiliate link. For example, the process 300, in whole or in part, can be implemented by the dynamic link updater 106. Although any number of systems, in whole or in part, can implement the process 300, to simplify discussion, portions of the process 300 will be described with reference to particular systems. Further, although primarily described with respect to a mobile application on a mobile computing system, the process 300 is not limited as such. In some cases, the process 300 can be performed with respect to any type of application and not just applications designed for execution on mobile computing systems. Further, the process 300, in some cases, may be performed with respect to any type of computing system and not just mobile computing systems.

The process 300 begins at block 302 where, for example, the dynamic link updater 106 detects an occurrence of an affiliate link access in an application (e.g., a mobile application 104) on a mobile computing system 102. The application may be an app based version of an affiliate network site, such as the affiliate network site 112. In some cases, the application may be configured to provide access to the affiliate network site 112 or features of the affiliate network site 112.

At block 304, the dynamic link updater 106 prevents access to a network site or target network site, such as a network site hosted by the interactive computing system 130, corresponding to the affiliate link accessed at the block 302. In some cases, the block 302 may be optional. Further, in some cases the block 304 may be conceptual or inherent in the performance of the process 300. In other words, in some cases, access to the target network site may be delayed rather than prevented as the remainder of the process 300 is performed.

The dynamic link updater 106, at block 306, determines an affiliate identifier for an associate, or affiliate, associated with the affiliate link accessed at the block 302. The affiliate identifier may be determined using a number of different processes, and in some cases multiple processes, for determining an affiliate identifier for the affiliate associated with the affiliate link. Some non-limiting examples of a process for determining the affiliate identifier can include, querying the affiliate network site 112, accessing metadata of the affiliate network site 112, querying a provider of the affiliate link, accessing metadata associated with a provider of the affiliate link, or analyzing another affiliate link included as part of the mobile application 104. Further, in some cases, the affiliate identifier may be determined from the data included as part of the mobile application 104. In certain embodiments, the block 306 may be omitted, such as in embodiments where the affiliate identifier is determined as part of the process 200. Further, in some embodiments, the block 306 may include one or more of the embodiments described with respect to the block 206.

At block 308, the dynamic link updater 106 determines device metadata associated with the mobile computing system 102. This device metadata may be determined by accessing one or more data storage locations associated with the mobile computing system 102, such as the device metadata repository 108. Other locations which may include device metadata accessible by the dynamic link updater 106 can include a bios memory, reserved memory, memory designated for the operating system of the mobile computing system 102, and any other location that may include configuration information for the mobile computing system 102. Further, the device metadata may be determined from a user login, user provided information, system configuration information, etc.

The device metadata can include any type of data associated with the mobile computing system 102 that might facilitate updating or correcting an affiliate link. Further, the device metadata can include any type of data that an operator of a target network site may use for data mining purposes and/or compensation purposes for an affiliate associated with the affiliate link. Some non-limiting examples of the device metadata for the mobile computing system 102 may include device type (e.g., a smart phone, a laptop, a tablet, etc.), operating system (e.g., a WINDOWS, LINUX, or IOS-based machine, etc.), network location, geographic location, identity of an owner type (e.g., privately owned or entity owned, such as by an employer of the owner, etc.), a user type (e.g., an owner, an administrator, a guest, etc.), and the like.

At block 310, the dynamic link updater 106 updates affiliate link parameters for the affiliate link accessed at the block 302 based on the affiliate identifier and/or the device metadata to obtain an updated or corrected affiliate link. In certain embodiments, the block 310 may include determining whether to update or correct an affiliate link, or its parameters, based on the affiliate identifier determined at the block 306 and/or the device metadata determined at the block 308. If so, the dynamic link updater 106 may update the affiliate link parameters at the block 310 and if not, the process of updating the affiliate link parameters may be omitted. In other embodiments, the affiliate link and/or the affiliate link parameters may be replaced or updated without performing a check. In some such cases, the resulting updated or corrected affiliate link may match the original affiliate link accessed at the block 302. In certain embodiments, the dynamic link updater 106 may update affiliate link parameters based on parameters used to update another affiliate link. In other words, upon a second occurrence of access of an affiliate link, the block 310 may use information obtained during a first or previous performance of the process 300 with respect to a previously accessed affiliate link, which may link to the target network site, a different network page of the target network site, or a different target network site.

At the block 312, the dynamic link updater 106 enables access to the network site hosted by the interactive computing system 130 via the affiliate link with the updated parameters. In certain embodiments, the process 300 occurs without the knowledge of the user who accessed the affiliate link. In other cases, the user may be made aware of the performance of the process 300 and, in some cases, may be presented with an option to prevent performance of the process 300.

Examples of Affiliate Links

FIGS. 4A-4C illustrate examples of affiliate links and corresponding updated affiliate links generated using embodiments described herein. FIG. 4A illustrates an example of an affiliate link 402 missing an affiliate identifier and a link type identifier. The updated affiliate link 404 of FIG. 4A illustrates an updated or corrected version of the affiliate link 402 that includes the affiliate identifier 406 ("aid") for identifying the affiliate (e.g., "entity5") to be associated with the affiliate link and the link type identifier 408 ("linktype") for identifying the type of affiliate link (e.g., "Type2," which may represent a text link, banner link, etc.). In certain embodiments, a user may access the affiliate link 402, but the target network site corresponding to the affiliate link 402 may be accessed via the updated affiliate link 404 generated by the dynamic link updater 106. As previously described, the updated affiliate link 404 may be generated in response to a user accessing the affiliate link 402.

The affiliate identifier may include a tag or parameter that can be generated for each affiliate or associate to be attributed credit for a user accessing the affiliate link 402. In some cases, an affiliate link includes a single tag for identifying a single affiliate. However, in other cases, an affiliate link may include multiple tags for identifying multiple affiliates to be given attribution for a user selecting or accessing the affiliate link. For example, in some cases, an entity who owns the affiliate network site 112 may share attribution credit for the affiliate link 402 with an entity that owns the network system 110 that hosts the affiliate network site 112.

The link type identifier may include a tracking parameter for identifying the type of affiliate link that was accessed by a user. For example, the link type identifier may identify the affiliate link as a text link, a banner link, or a widget. Further, in some cases, the link type identifier may also identify whether the affiliate link is a link to the homepage or main page of the corresponding network site or is a link to a sub page, such as an item detail page of an item or a search page.

It should be understood that the updated affiliate link 404 may include additional parameters. Typically, the parameters may provide one or more pieces of information relating to the affiliate that provided the affiliate link 404, the mobile application 104 that presented the affiliate link to a user, the corresponding affiliate network site 112 corresponding to the mobile application 104, the mobile computing system 102 hosting the mobile application 104, the user accessing the affiliate link, and/or the type of affiliate link access. Generally, the parameters do not provide information relating to the identity of the user who accessed the affiliate link. Thus, in certain embodiments, the privacy of the user may be maintained. However, in some cases, identifying information of the user who accessed via affiliate link 402 may be provided via the updated affiliate link 404. Advantageously, in certain embodiments, identifying information of the user may be used for associating discounts with an account of the user or for providing improved recommendations to the user, among other reasons.

FIG. 4B illustrates an example of an affiliate link 410 that includes an affiliate identifier 414 and a link type identifier 416. However, the affiliate identifier 414 and the link type identifier 416 include the wrong values. The dynamic link updater 106 may determine that the affiliate link 410 includes the incorrect values for the affiliate identifier 414 and the link type identifier 416 based on an affiliate identifier determined as part of the process 300 and/or device metadata determined as part of the process 300. The updated affiliate link 412 corresponds to the affiliate link 410, but replaces the affiliate identifier 414 and the link type identifier 416 with an affiliate identifier 418 and a link type identifier 420, respectively. The affiliate identifier 418 and the link type identifier 420 include updated or corrected values as determined using, for example, the process 300.

FIG. 4C illustrates an example of an affiliate link 430 that includes an affiliate identifier 436 located after a '#' character and thus, may not be identified as a tag parameter for identifying an affiliate to receive attribution. Further, the protocol identifier 434 indicates that the affiliate link 430 uses a hypertext transfer protocol (HTTP). In addition, the affiliate link 430 is missing a link type parameter. It should be noted that, although in this case the link type identifier parameter is considered missing, in some cases, a link type identifier may be unnecessary or omitted intentionally. The types of parameters that should be included with an affiliate link are often application-specific, target network site specific, or based on an affiliate agreement between an affiliate and an entity associated (e.g., owning, managing, leasing, etc.) with the target network site.

The updated affiliate link 432 includes an updated protocol identifier 438 that utilizes HyperText Transfer Protocol Secure (HTTPS) for secure communication over a network 114. Further, the updated affiliate link 432 includes an affiliate identifier 440 that identifies the affiliate corresponding to the affiliate link and a link type identifier 442 identifying the type of affiliate link. Although the affiliate identifier 440 does not match the affiliate identifier 436, the affiliate identifier 444 may not be updated and may continue to match the affiliate identifier 436 because, in some cases, the text subsequent to the '#' character is not treated as a parameter and, in some cases, may be ignored. Alternatively, the affiliate identifier 444 may be updated to match the affiliate identifier 440.

It should be understood that the examples presented in the FIGS. 4A-4C are non-limiting examples of affiliate links and updated or corrected affiliate links with updated or added parameters. Other examples of affiliate links and updated or corrected affiliate links are possible. For example, affiliate links may include any combination and any number of affiliate identifiers, affiliate link types, and device metadata that may be used to monitor use of the affiliate links and/or to compensate owners of the affiliate links. As a second example, an affiliate link may be updated to point to an alternative network site based on a location of the computing device used to access the affiliate link. Advantageously, in certain embodiments, an affiliate link that points to a network site designed for one geographic region may be updated to point to a version of the network site designed for the geographic region where the mobile computing system 102 is determined to be located. In other words, an affiliate link that points to a U.S.A. based target network site may be updated to point to an E.U. target network site when it is determined that the mobile computing system 102 is located in an E.U. country.

Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of dynamically correcting an affiliate link within an application, the method comprising:
    detecting access to an affiliate link selected from within an application generated from a first website and executing on a mobile computing system comprising computer hardware, wherein the application comprises a substitute for the first website of a first entity and includes at least some of the same content as the first website enabling a user to access the at least some of the same content using a browser to access the first website or using the application without the mobile computing system communicating with the first website, the affiliate link comprising a Uniform Resource Locator (URL) corresponding to a second website associated with a second entity that is different than the first entity, the affiliate link a copy of an affiliate link included as part of the content from the first website, wherein the application provides access to the content from the first website without accessing a browser for accessing the first website and without accessing the first website;
    identifying an affiliate identifier of an affiliate associated with the affiliate link, wherein the first entity corresponds to the affiliate, and wherein the affiliate identifier is determined by at least accessing affiliate metadata of the affiliate;
    identifying device metadata associated with the mobile computing system;
    determining, based at least in part on one or more of the affiliate identifier or the device metadata, that the affiliate link is to be replaced with a corrected affiliate link;
    creating the corrected affiliate link from the affiliate link based at least partially on the affiliate identifier and the device metadata, the corrected affiliate link enabling access to the second website associated with the affiliate link, the corrected affiliate link comprising a modified version of the URL with one or more modified URL parameters, wherein the second website credits an account based at least in part on network traffic redirected to the second website, the affiliate identifier, and a determination that the affiliate link was accessed from the application;
    preventing access to the second website via the affiliate link selected from within the application executing on the mobile computing system; and
    overriding at least a portion of the application with a dynamic link updater that replaces the affiliate link with the corrected affiliate link,
    wherein at least said creating the corrected affiliate link is performed by a hardware processor of the mobile computing system.

2. The method of claim 1, wherein the affiliate link and the corrected affiliate link share the same format.

3. The method of claim 1, wherein the affiliate link and the corrected affiliate link comprise one or more of a text link or an image link.

4. The method of claim 1, wherein the corrected affiliate link includes one or more parameters based on one or more of the affiliate identifier and the device metadata.

5. The method of claim 1, wherein the corrected affiliate link includes a modified protocol identifier, the modified protocol identifier comprising a modified version of a protocol identifier included in the affiliate link.

6. The method of claim 1, wherein the device metadata identifies one or more of a device type, an operating system type, and a network communications protocol used by the mobile computing system to access the first website.

7. The method of claim 1, further comprising determining a location of the mobile computing system.

8. The method of claim 7, wherein said creating the corrected affiliate link is based at least partially on the location of the mobile computing system.

9. The method of claim 1, further comprising accessing the second website via the corrected affiliate link responsive to the access of the affiliate link from within the application executing on the mobile computing system.

10. A system for dynamically updating an affiliate link within an application, the system comprising:
    a computer system comprising computer hardware, the computer system programmed to implement a dynamic link updater stored in a memory of the computer system, the dynamic link updater configured to:
- detect access to an affiliate link selected from within an application generated from a first network site and executing on the computer system, the application corresponding to the first network site of a first entity, and the affiliate link comprising a link to a second network site of a second entity that differs from the first entity, wherein the application comprises a substitute for the first network site of the first entity and provides access to content from the first network site and includes at least some of the same content as the first network site enabling a user to access the at least some of the same content using the application without interacting with the first network site via a browser;
- identify an affiliate identifier of an affiliate associated with the affiliate link, the affiliate corresponding to the first entity, wherein the affiliate identifier is determined by at least accessing affiliate metadata of the affiliate;
- identify device metadata associated with the computer system;
- determine, based at least in part on one or more of the affiliate identifier or the device metadata, that the affiliate link is to be replaced with an updated affiliate link;
- create the updated affiliate link from the affiliate link based at least partially on the affiliate identifier and device metadata, enabling the second entity to credit the first entity based at least in part on network traffic redirected to the second network site, the affiliate identifier, and whether the updated affiliate link was selected from the application or the first network site;
- prevent the computer system from accessing the second network site via the affiliate link while enabling access to the second network site via the updated affiliate link; and
- override at least a portion of the application with a link updater that replaces the affiliate link with the updated affiliate link.

11. The system of claim 10, wherein the updated affiliate link includes one or more parameters based on one or more of the affiliate identifier and the device metadata.

12. The system of claim 10, wherein the dynamic link updater is further configured to determine a location of the computer system and to create the updated affiliate link based at least partially on the location.

13. The system of claim 12, wherein the updated affiliate link provides access to a third network site instead of the second network site.

14. The system of claim 13, wherein the third network site comprises a localized version of the second network site configured for users within a region that includes the location of the computer system.

15. The system of claim 10, wherein the computer system is further programmed to access the second network site via the updated affiliate link responsive to the access of the affiliate link from within the application.

16. Non-transitory physical computer storage comprising instructions stored thereon that, when executed by one or more processors, are configured to at least:
- detect access to an affiliate link selected from within an application generated from a first network site and executing on a computer system, the application corresponding to the first network site of a first entity, and the affiliate link comprising a link to a second network site of a second entity that differs from the first entity, wherein the application comprises a substitute for the first network site of a first entity and provides access to content from the first network site, enabling access to the content from the first network site without accessing the first network site and includes at least some of the same content as the first network site enabling access to the at least some of the same content using the application without interacting with the first network site;
- identify device metadata associated with the computer system;
- determine, based at least in part on one or more of the affiliate identifier or the device metadata, that the affiliate link is to be replaced with an updated affiliate link;
- create the updated affiliate link from the affiliate link based at least partially on the device metadata and an affiliate identifier for an affiliate associated with the affiliate link; and
- override at least a portion of the application with a dynamic link updater that replaces the affiliate link with the updated affiliate link.

17. The non-transitory physical computer storage of claim 16, wherein the instructions are further configured to:
- access an affiliate identifier associated with an entity that provided the affiliate link; and
- create the updated affiliate link based at least partially on the affiliate identifier.

18. The non-transitory physical computer storage of claim 16, wherein the updated affiliate link includes one or more parameters based on the device metadata.

19. The non-transitory physical computer storage of claim 16, wherein the updated affiliate link directs a user to an alternative network site.

20. The non-transitory physical computer storage of claim 19, wherein the alternative network site is selected based on a location of the computer system.

21. The non-transitory physical computer storage of claim 20, wherein the location comprises one or more of a geographic location and a network location.

* * * * *